Inventors
A. G. WILSON
R. JOHNSTON
By Holcombe, Wetherill & Brisebois
Attorneys 3,564,769
ANTI-THEFT DEVICE
Arthur G. Wilson, 1 Watson Ave., Neutral Bay, New South Wales, Australia, and Roy Johnston, 36 Lucasville Road, Glenbrook, New South Wales, Australia
Filed Mar. 18, 1969, Ser. No. 808,164
Claims priority, application Australia, Mar. 28, 1968, 35,693/68
Int. Cl. E05b 65/00
U.S. Cl. 49—35  2 Claims

ABSTRACT OF THE DISCLOSURE

A vehicle anti-theft device having inner and outer tubular members, the outer tube being secured in the ground so that it does not project appreciably above ground level, the inner tube being arranged so that it may be positioned substantially above ground level and having locking means positioned in it which may be brought into engagement with the outer tube.

SUMMARY OF THE INVENTION

This invention relates to a vehicle anti-theft device and has been developed for use in driveways so as to prevent unauthorised removal therefrom.

The invention concerns the application of a lockable post which may be retracted when not in use and is adapted to be inserted into a driveway to prevent a vehicle from being taken past the device.

In one form of the present invention there is provided inner and outer tubular members, the first tube being arranged to be mounted inside the other, the outer tube is adapted to be secured into the ground structure and the inner tube is adapted to be pulled up so as to extend above ground level a sufficient distance to prevent a car passing over it. Normally the device of this invention will be positioned approximately a car's length from an abutment such as a wall.

BRIEF DESCRIPTION OF THE DRAWINGS

The invention is hereinafter described by way of example with reference to the accompanying drawings in which.

Figure 2:
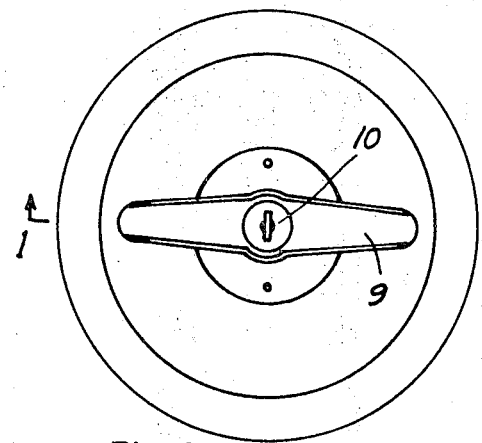
FIG. 2 is a plan view of the device of FIG. 1.
Figure 3:
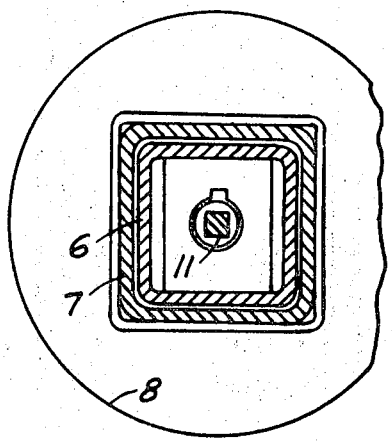
FIG. 3 is a cross sectional plan view along the line 3—3 of FIG. 1.
Figure 4:
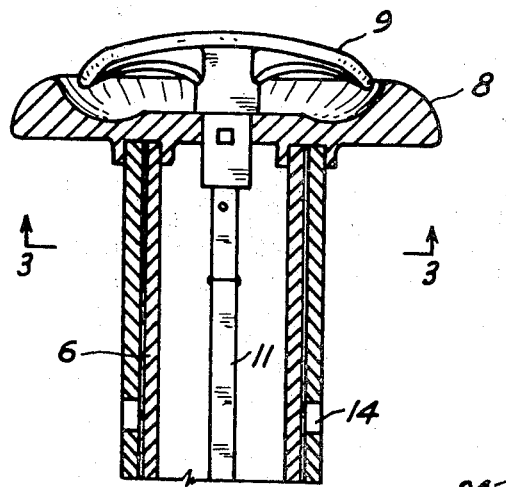
FIG. 4 is a cross sectional plan view along the line 4—4 of FIG. 1.
Figure 4:
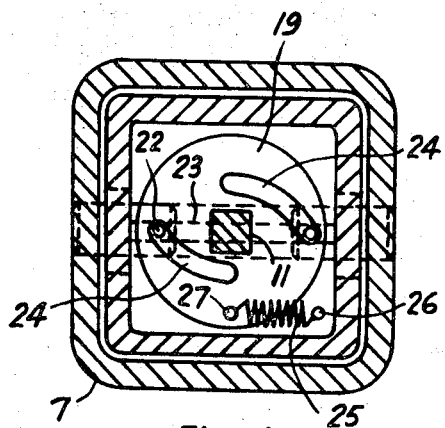
Figure 1:
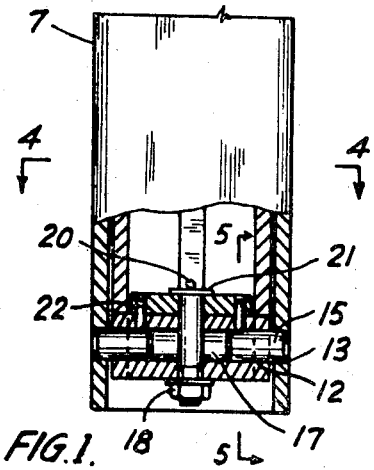
FIG. 1 is a cross sectional side elevation of the device of the present invention.
Figure 5:
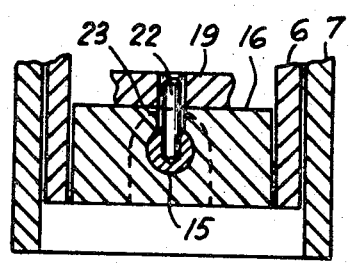
FIG. 5 is a cross sectional plan view along the line 5—5 of FIG. 1.

A first tube 6 is mounted in a second tube 7 and has a locking cap 8 which prevents water from entering when in the closed up position.

A lifting handle 9 is provided to lift the first tube 6 into the erected position.

The locking system may be the usual cylinder lock 10 operating through a connecting rod 11 to a lever system at the lower end to lock the first tube member 6 in the down and erected position or in the erected position. For this purpose matching slots 12, 13 and 14 for receiving locking plungers 5 may be provided in the lower end of the inner tube and the upper and lower ends of the outer tube 7.

The lower end of the inner tube has a plug member 16 in which the plungers 15 are slidably mounted in a transverse slot 17. The bottom end of the connecting rod 11 is journalled in plug member 16 and its distal end is provided with a fastening device such as a nut 18. A cam 19 is keyed to the shaft 11 above the plug member 16 and is retained in position against the latter by means of a split pin 20 in the shaft 11 and a washer 21 between the split pin and the plug member.

The plungers 15 have pins 22 extending up towards the cam member 19 and these pass through a slot 23 in the plug member. The pins 22 locate in cam slots 24 in the cam member so that as the cam member is rotated by the handle 9 the slots 24 acting on the plungers 15 are either advanced or retracted to or from the holes 13 or 14 in the outer tube according to whether or not the inner tube is in the down or erected position.

A biassing spring 25 is positioned between a pin 27 on the plug member and a pin 27 on the cam member. This causes the device to return to the locked position. If desired this spring may be mounted on the connecting rod 11.

If desired the inner tube 6 may act as a piston in the outer tube 7 and raising effected by admitting air, oil or water into the space below the lower end of the inner tube.

The device of this invention as it retracts to ground level does not constitute a danger to pedestrians and does not detract from the appearance from a driveway.

It may be used in conjunction with a parking meter so as to cause the inner tube to move to the erected position when the meter expires.

In a further arrangement the inner tube is locked in the erected position by a lock passing through matching holes in it and the outer tube at or about ground level. In this construction the assembly may be covered when not in use by a lid which extends over a recess housing the tubes. Similarly the outer tube may have a part with limited outward movement to permit such a simplified locking construction whilst still permitting a flush type of arrangement of the components.

I claim:
1. An anti-theft device comprising an inner tube slidably positioned within an outer tube, said outer tube being provided with longitudinally spaced radial holes, a locking cap secured to one end of the inner tube, a plug member carried by said inner tube within said outer tube, a connecting rod journalled in said plug member and projecting through said cap, a handle mounted on said connecting rod on the opposite side of said cap from said plug, and a locking plunger mounted in said plug member for radial operation by said connecting rod into and out of one of the holes in said outer tube when said inner tube is in a retracted position within said outer tube, and into and out of another of said holes when said inner tube is in an erected position projecting from said outer tube.

2. A device as claimed in claim 1 comprising a pin member fixed to said locking plunger and a cam member secured to said connecting rod, said pin member extending up through a slot in the plug member and locating in a cam slot in said cam member to translate rotary movement of the connecting rod into linear movement of the locking plunger.

References Cited

UNITED STATES PATENTS

| 2,610,502 | 9/1952 | Carlson | 94—1.5X |
| 2,624,307 | 1/1953 | Caffrey | 49—131UX |
| 2,819,547 | 1/1958 | Clements | 94—1.5UX |
| 3,086,430 | 4/1963 | Emmel | 94—1.5X |
| 3,451,164 | 6/1969 | Kappelman | 49—131X |

DENNIS L. TAYLOR, Primary Examiner

U.S. Cl. X.R.

49—131